(12) United States Patent
Meiners et al.

(10) Patent No.: US 6,636,401 B1
(45) Date of Patent: *Oct. 21, 2003

(54) NETWORK PROTECTOR WITH INSULATED LAMINATED BUS CONSTRUCTION

(75) Inventors: Steven E. Meiners, Beaver Falls, PA (US); Douglas M. Brandt, Elwood City, PA (US); Michael F. Magazine, Adah, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,424

(22) Filed: May 26, 2000

(51) Int. Cl.$^7$ ................................................ H02H 3/00
(52) U.S. Cl. ............................. 361/62; 361/64; 361/66; 361/58; 361/115
(58) Field of Search ................................. 361/115, 118, 361/58, 62, 64, 66, 78, 15

(56) References Cited

U.S. PATENT DOCUMENTS

| | | | |
|---|---|---|---|
| 4,057,843 A | * 11/1977 | Saligny | 361/104 |
| 5,822,165 A | 10/1998 | Moran | 361/78 |
| 6,034,861 A | 3/2000 | Meiners et al. | 361/115 |

* cited by examiner

*Primary Examiner*—Stephen W. Jackson
(74) *Attorney, Agent, or Firm*—Martin J. Moran

(57) ABSTRACT

A bus assembly for a network protector, where the network protector includes a housing, and where the bus assembly includes a plurality of busses having laminations and a rack assembly. The plurality of busses are mounted in the rack assembly and the rack assembly is coupled to the housing.

17 Claims, 4 Drawing Sheets

NETWORK PROTECTOR WITH INSULATED LAMINATED BUS CONSTRUCTION

BACKGROUND OF THE INVENTION

1. Field of the Invention

This invention relates to a network protector and, more specifically, to a network protector which incorporates laminated line buses and load buses.

2. Description of the Prior Art

Secondary power distribution networks consist of interlaced grids which are supplied by two or more sources of power so that the loss of a single source of power will not result in an interruption of service. Such networks provide the highest level of reliability possible with conventional power distribution and are normally used to supply high-density load areas such as a section of a city, a large building, or an industrial site. Between the power sources and the network is a transformer and a network protector. The network protector consists of a circuit breaker and a control relay. The control relay senses the transformer and network voltages and line currents and executes algorithms to initiate breaker tripping or closing action. Trip determination is based on detecting an overcurrent condition or reverse power flow, that is, power flow from the network to the energy source.

Network protectors are often found in dust-proof or moisture-proof housings which are disposed in subterranean passageways in large metropolitan areas. The lineside and loadside busses are mounted inside the housing. To prevent the electrical buses from contacting water in the event of a flood, the lineside terminals and the loadside bus terminals extend upwardly towards the top on the housing. Connectors are coupled to the busses through opening near the top, or on the top, of the enclosure. Electrical buses connecting the circuit breaker to the transformer and the circuit breaker to the load were constructed with a hollow square cross-section in order to increase the surface area, and therefore the emissivity, of the bus. This shape also allowed air to flow through the bus and remove heat by convection. The square tubular busses made by a single manufacture which is located in France. As such, the square tubular busses must be imported and availability is subject to the manufacturer. Additionally, the square busses were designed to cooperate with a rollout circuit breaker, and will not accommodate a drawout breaker. Drawout circuit breakers are now preferred because of safety of operation and maintenance. Drawout circuit breakers cannot fit within the housing due to the shape of the busses.

The use of thinner busses would be desirable; however, due to the amount of current flowing through the buses (greater than 2000 amps) solid, flat bus bars may not be used. Solid bus bars do not have a sufficient emissivity to meet the temperature rise specification. That is, due to the current flowing through the buses, the temperature of a flat bus bar would be above the 140° C. rise criteria, which is unacceptable. Such high temperatures would place thermal stress on the bus and eventually allow the bus to degrade prematurely.

There is, therefore, a need for a thin bus for a network protector which does not result in an excessive bus temperature.

There is a further need for a reduced length bus for a network protector which may be used with a drawout circuit breaker.

SUMMARY OF THE INVENTION

These needs and others are satisfied by the invention which provides network protector buses constructed of multiple, spaced laminations. Multiple laminations allow the bus to have a sufficient surface area to allow cooling to occur despite the reduced width. With a reduced bus width, a drawout circuit breaker may be located within the network protector housing. The width occupied by the electrical buses may further be reduced by coating the buses with a dielectric epoxy, thereby allowing the loadside buses and the lineside buses to be nested together. The epoxy coating also increases the emissivity of the bus surface thereby reducing the heat buildup.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
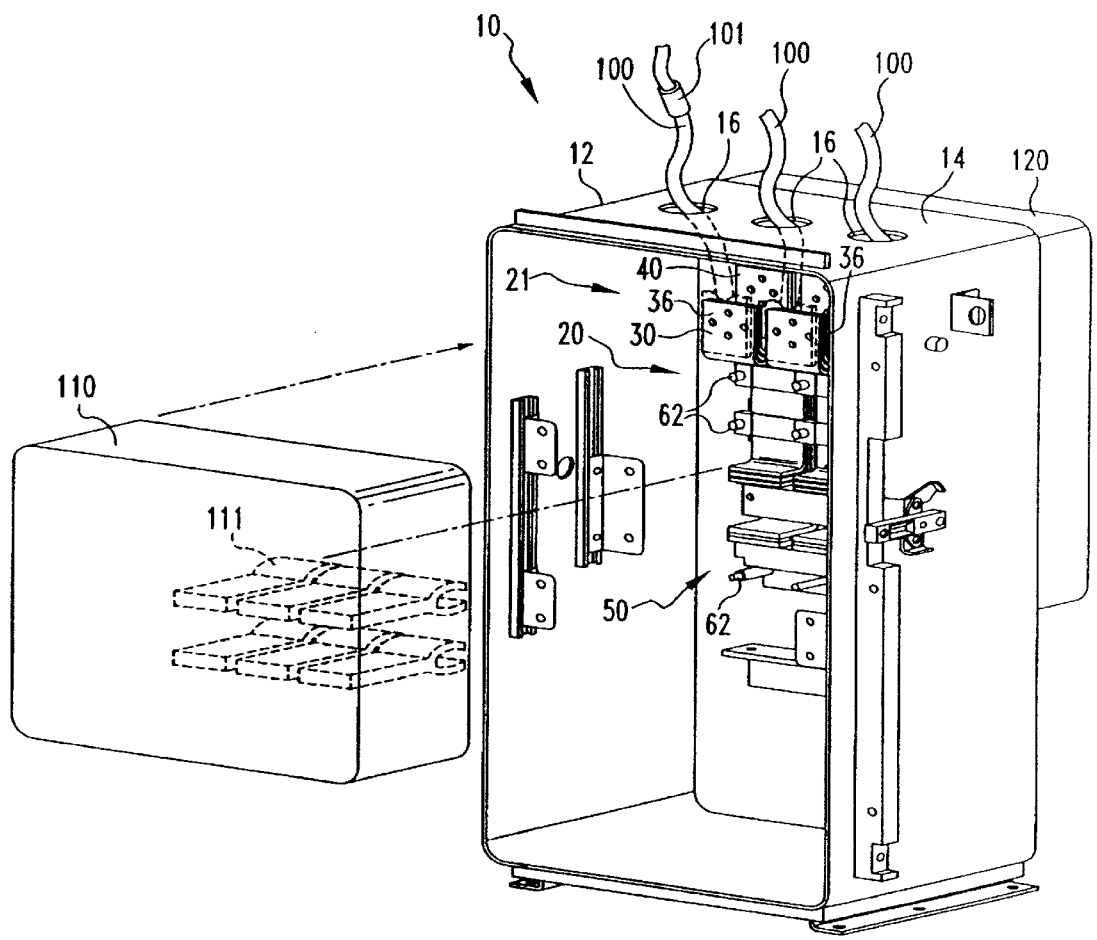
FIG. 1 shows a network protector housing with a loadside bus and a lineside bus mounted therein.

As shown in FIG. 1, a network protector 10 includes a housing 12 which, though shown without a front cover, may be adapted to be dustproof or waterproof by the use of a cover. A bus assembly 20 is mounted within housing 12. The bus assembly 20 includes a plurality of busses 21, including a plurality of loadside busses 30 and a plurality of lineside busses 40, and a rack assembly 50. Housing 12 includes a top plate 14 having a plurality of openings 16 therethrough.

Figure 2:
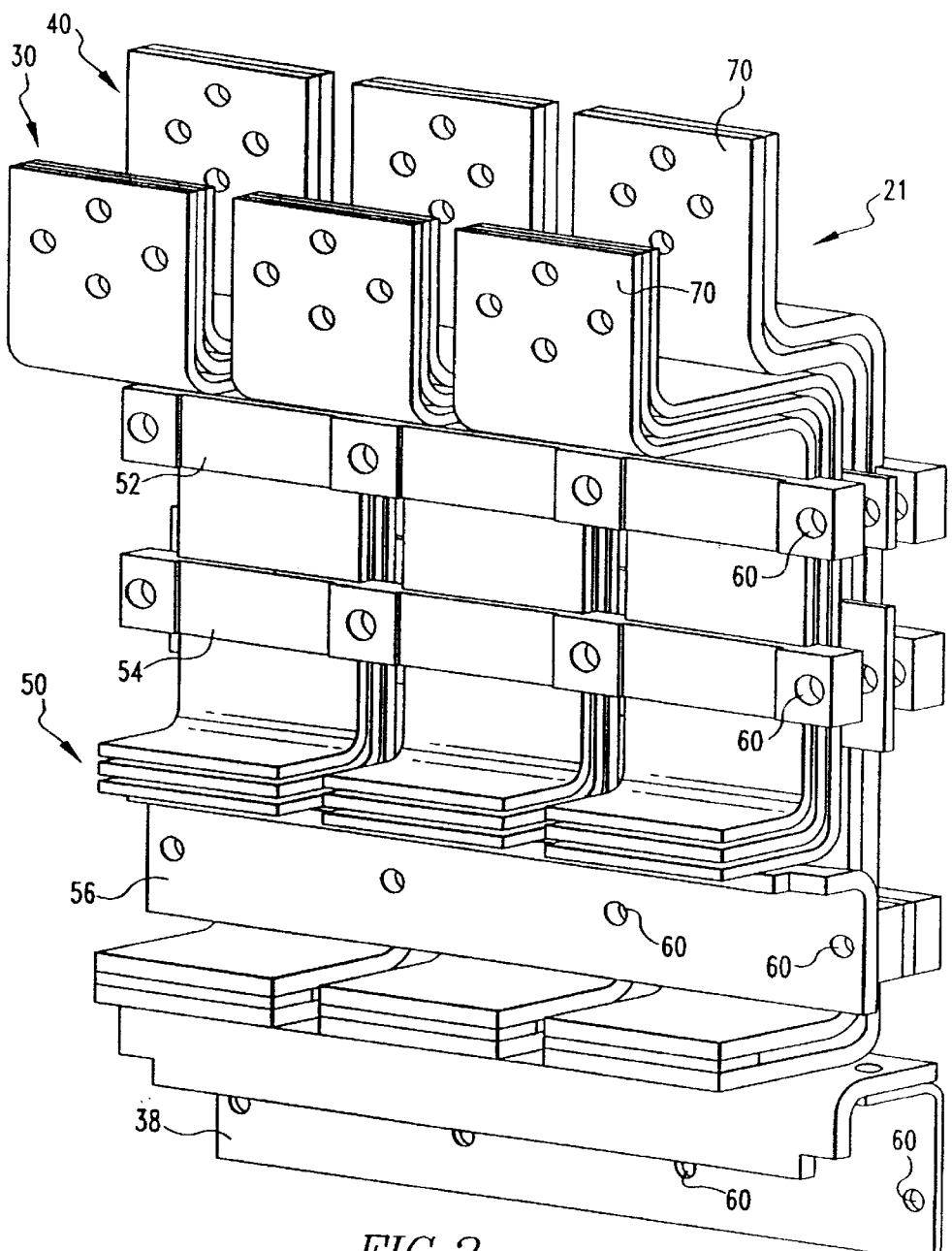
FIG. 2 is an isometric view of a bus assembly.
Figure 3:
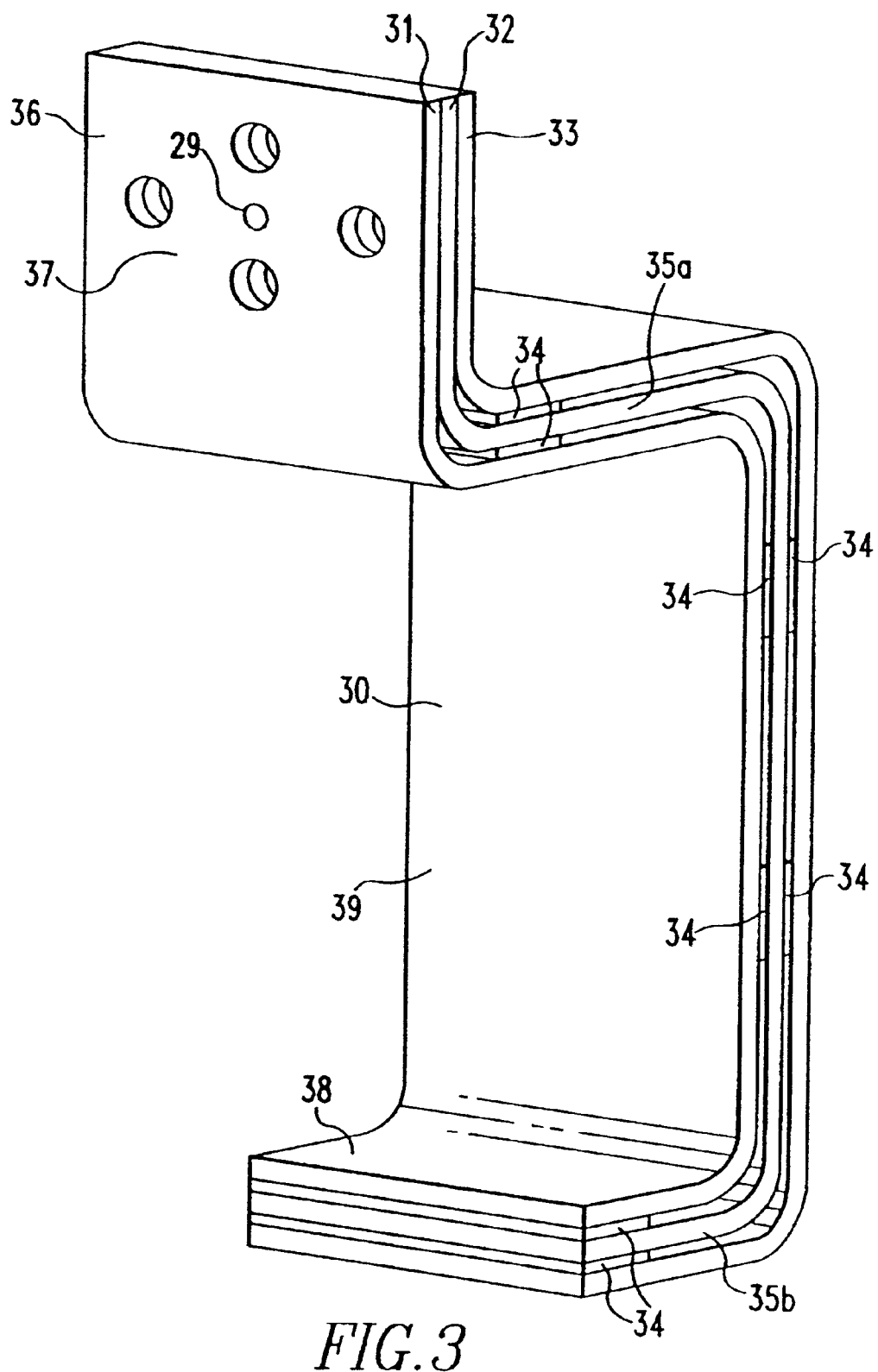
FIG. 3 is an isometric view of a loadside bus.

As shown on FIG. 2, in a three phase embodiment, there are three loadside buses 30 and three lineside buses 40. As shown on FIG. 3, the loadside bus 30 includes at least two, and preferably three, spaced laminations 31, 32, 33. The laminations 31, 32, 33 are generally held in a spaced relation by conductive spacers 34. The laminations 31, 32, 33 are formed in a U-shape having a base portion 39 and two generally perpendicular sidewalls 35A, 35B. One of the sidewalls 35A includes an extending tab 36. Tab 36 acts as a connection terminal 37 so that the loadside bus 30 may be coupled to a network cable 100. Laminations 31, 32, 33 may be brazed and/or pinned together by a pin 29, together at the terminal 37. The sidewall 35B opposite the terminal 37, is an integral stab 38 which is structured to be coupled with a drawout circuit breaker 110.

Figure 4:
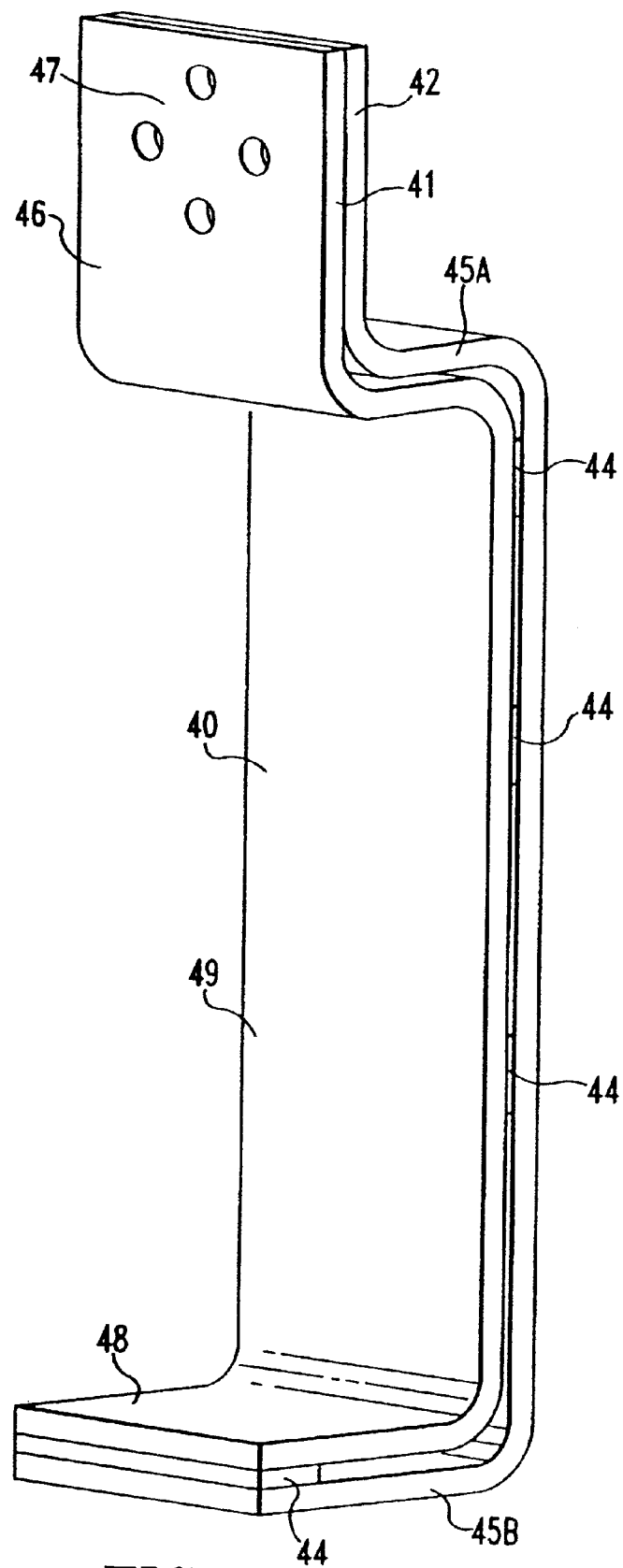
FIG. 4 is an isometric view of a lineside bus.

As shown on FIG. 4, the lineside bus 40 includes at least two generally spaced laminations 41, 42. The laminations 41, 42 are generally held in a spaced relation by conductive spacers 44. The laminations 41, 42 are formed in a U-shape having a base portion 49 and two generally perpendicular sidewalls 45A, 45B. One of the sidewalls 45A includes an extending tab 46. Lineside bus base portion 49 is longer than loadside bus base portion 39, while loadside bus sidewalls 45A, 45B are shorter than lineside sidewalls 35A, 35B. Tab 46 acts as a connection terminal 47 so that the lineside bus 40 may be coupled to a transformer 120. Laminations 41, 42 may be brazed and/or pinned together by a pin 29, together at the terminal 47. The sidewall 45B opposite the terminal 47, is an integral stab 48 which is structured to be coupled with a drawout circuit breaker 110.

Typically, the loadside bus 30 must have a greater surface area, and therefore more laminations, because the loadside bus requires greater emissivity to reduce heat build up. Unlike the lineside bus 40, the loadside bus 30 is coupled to a cable 100 (described below) which includes a fuse 101. The fuse 101 prevents the loadside bus 30 from dissipating heat as quickly as the lineside bus 40.

As shown in FIG. 2, the loadside buses 30 and the lineside buses 40 may be mounted on a rack assembly 50. The rack assembly 50 includes a plurality of mounting brackets 52, 54, 56 which are structured to hold the loadside buses 30 in a parallel spaced relation and the lineside buses 40 in a parallel spaced relation. When mounted within enclosure 12, stabs 38 and 48 extend in a generally horizontal direction from rack assembly 50. Because the loadside bus base portion 39 is shorter than the lineside bus base portion 49, the mounting brackets 52, 54, 56 further hold the loadside buses 30 nested within the lineside buses 40. The rack assembly 50 further includes a lower bracket 58. Each of the mounting brackets 52, 54, 56 and lower bracket 58 include openings 60 therethrough. As shown on FIG. 1, mounting rods 62 may be attached to housing 12, mounting rods 62 pass through rack openings 60 and members 52, 54, 56 and 58. Both the loadside busses 30 and the lineside busses 40 have an outer coating of a dielectric epoxy 70, such as dexter hysol epoxy. The dielectric epoxy 70 prevents electrical arcing between the loadside busses 30 and the lineside busses 40. The dielectric epoxy 70 also increases the emissivity of the loadside busses 30 and the lineside busses 40 so that the loadside busses 30 and the lineside busses 40 are not subject to excessive heat build up.

As also shown in FIG. 1, housing openings 16 are aligned above loadside terminal ends 36. In this configuration, a network cable 100 may be passed through housing top plate 14 and coupled to the terminal ends 36 of the loadside buses 30. The network cable 100 typically includes an integral fuse 101. The loadside bus stabs 38 are engaged in a known manner by quick disconnects 111 on the drawout circuit breaker 110 as the breaker is inserted into the housing 12. Lineside bus terminal ends 46 may be coupled to a transformer 120 or any other power source by cables (not shown) extending through the back wall of the housing 12. The lineside bus stabs 48 may also be coupled to the drawout circuit breaker 110 in a known manner such as quick disconnects 111.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A bus assembly for a network protector, said network protector having a housing, said bus assembly comprising:
    a plurality of busses having laminations; and
    a rack assembly, mounted in said housing;
    said plurality of busses being mounted in said rack assembly.
2. The bus assembly of claim 1 wherein:
    said plurality of busses include busses having at least two generally spaced laminations.
3. The bus assembly of claim 2 wherein:
    said plurality of busses includes a plurality of roadside busses and a plurality of lineside busses.
4. The bus assembly of claim 3 wherein:
    said plurality of loadside buses include three generally spaced laminations; and
    said plurality of lineside busses include two generally spaced laminations.
5. The bus assembly of claim 4 wherein:
    said plurality of loadside busses and said plurality of lineside busses each have an outer coating of dielectric epoxy.
6. The bus assembly of claim 5 wherein:
    said plurality of loadside busses and said plurality of lineside busses are each U-shaped having a base portion, two sidewalls and a tab;
    said tab extending from one side wall;
    said plurality of loadside busses having a shorter base portion than said lineside busses base portion; and
    said plurality of loadside busses are nested within said plurality of lineside busses.
7. The bus assembly of claim 6 wherein:
    said sidewall opposite said tab forms an integral stab;
    said stab extending generally horizontally in said housing.
8. The bus assembly of claim 2 wherein:
    said laminations have an outer coating of dielectric epoxy.
9. A network protector comprising:
    a transformer
    a drawout circuit breaker
    a housing; and
    a bus assembly;
    said bus assembly comprising:
        a plurality of busses having laminations;
        a rack assembly;
        said plurality of busses are disposed in said rack assembly;
        said rack assembly coupled to said housing.
10. The network protector of claim 9 wherein:
    said plurality of busses include busses having at least two generally spaced laminations.
11. The network protector of claim 10 wherein:
    said plurality of busses includes a plurality of roadside busses and a plurality of lineside busses.
12. The network protector of claim 11 wherein:
    said plurality of loadside buses include three generally spaced laminations; and
    said plurality of lineside busses include two generally spaced laminations.
13. The network protector of claim 12 wherein:
    said plurality of loadside busses and said plurality of lineside busses each have an outer coating of dielectric epoxy.
14. The network protector of claim 13 wherein:
    said plurality of loadside busses and said plurality of lineside busses are each U-shaped having a base portion, two sidewalls and a tab;
    said tab extending from one side wall;
    said plurality of loadside busses having a shorter base portion than said lineside busses base portion; and
    said plurality of loadside busses are nested within said plurality of lineside busses.
15. The bus assembly of claim 14 wherein:
    said sidewall opposite said tab forms an integral stab;
    said stab extending generally horizontally in said housing.
16. The network protector of claim 15 wherein:
    said housing includes openings;
    said plurality of lineside busses are coupled to both said circuit breaker and said transformer; and said plurality of loadside busses include a tab portion; and said plurality of loadside busses are coupled to said circuit breaker with said loadside bus tabs aligned with said housing openings.

17. The network protector of claim 10 wherein:

said laminations have an outer coating of dielectric epoxy.

* * * * *